Figure 5:
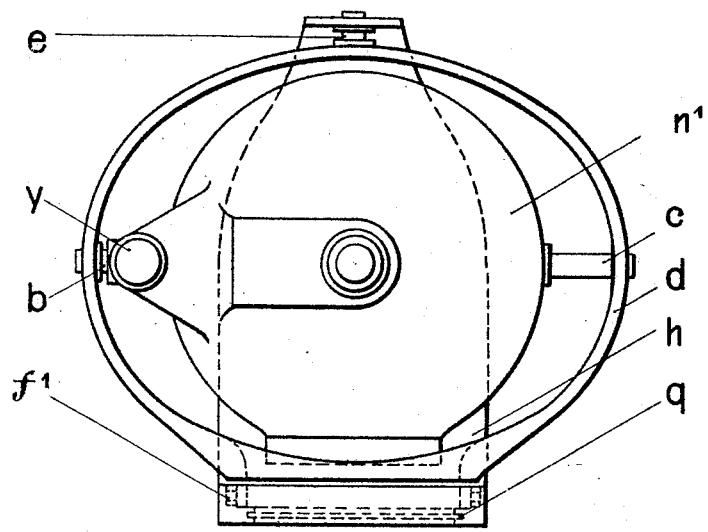

April 14, 1925.  1,533,941
W. OTTO
GYROSCOPIC APPARATUS HAVING A MEANS FOR INDICATING THE INCLINED
POSITION OF AN AIRSHIP OR THE LIKE
Filed Oct. 25, 1924   3 Sheets-Sheet 1
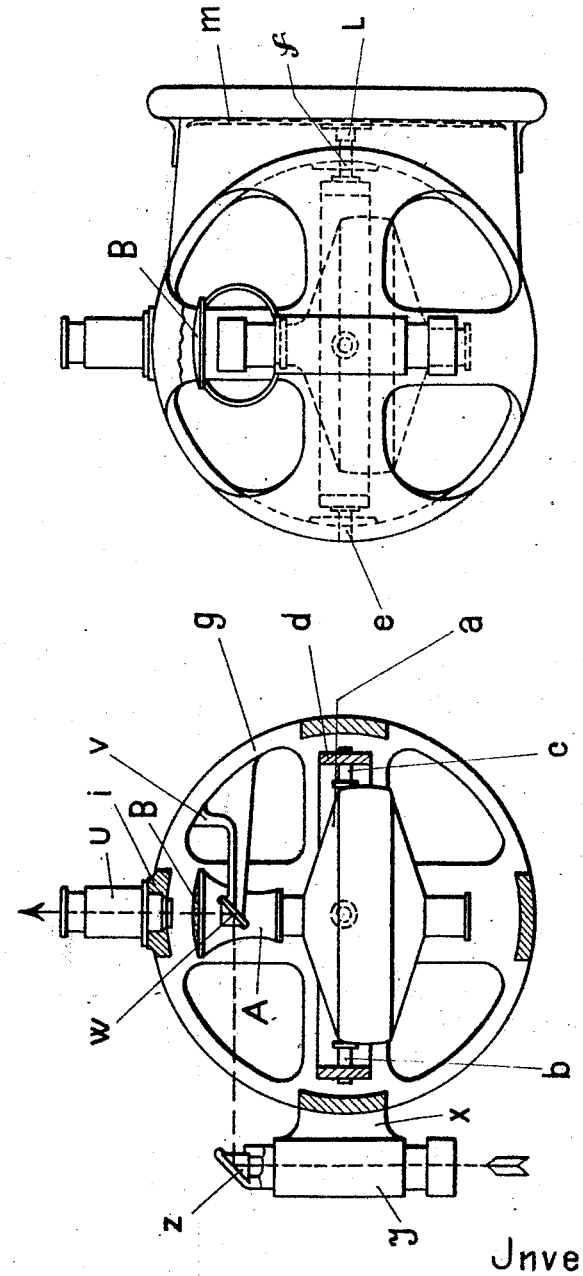
Inventor:
Wolfgang Otto
By
Pennie, Davis, Marvin Edmonds
Attorneys April 14, 1925. 1,533,941
W. OTTO
GYROSCOPIC APPARATUS HAVING A MEANS FOR INDICATING THE INCLINED
POSITION OF AN AIRSHIP OR THE LIKE
Filed Oct. 25, 1924 3 Sheets-Sheet 2
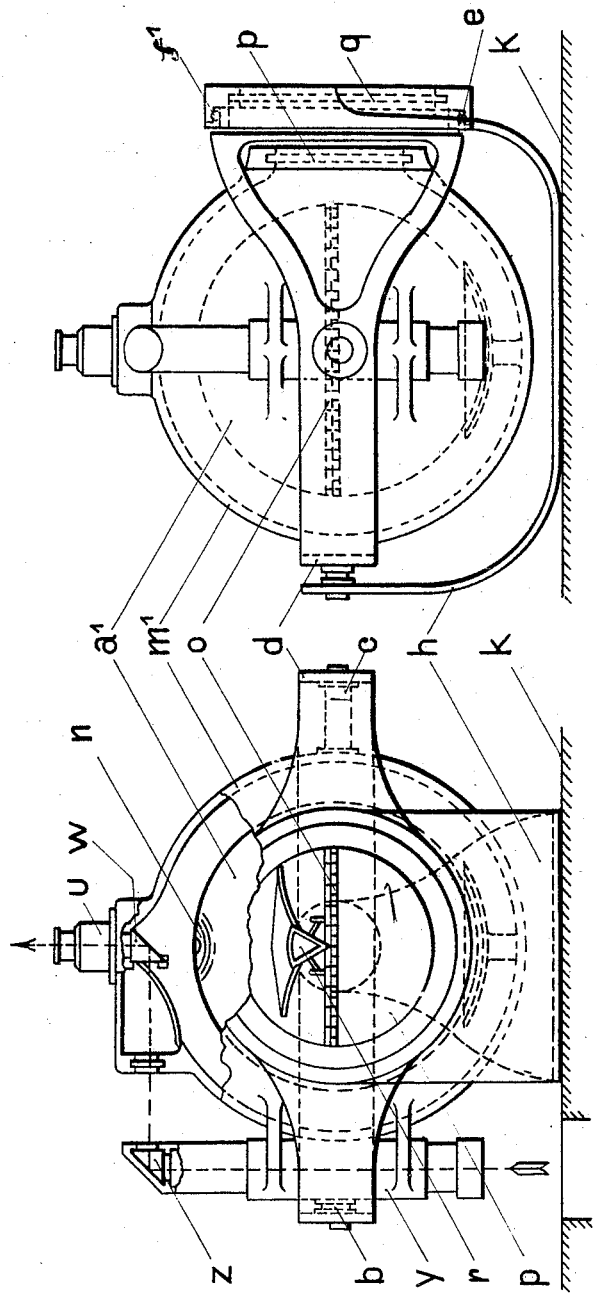
Inventor:
Wolfgang Otto
By
Pennie, Davis, Marvin & Edmonds
Attorneys April 14, 1925.
W. OTTO
1,533,941
GYROSCOPIC APPARATUS HAVING A MEANS FOR INDICATING THE INCLINED
POSITION OF AN AIRSHIP OR THE LIKE
Filed Oct. 25, 1924
3 Sheets-Sheet 3

Inventor:
Wolfgang Otto
By
Pennie, Davis, Marvin Edmonds
Attorneys

Patented Apr. 14, 1925.

1,533,941

UNITED STATES PATENT OFFICE.

WOLFGANG OTTO, OF NEUMUHLEN, NEAR KIEL, GERMANY, ASSIGNOR TO NEDERLANDSCHE TECHNISCHE HANDEL MAATSCHAPPIJ "GIRO" OF 'S-GRAVENHAGE, NETHERLANDS.

GYROSCOPIC APPARATUS HAVING A MEANS FOR INDICATING THE INCLINED POSITION OF AN AIRSHIP OR THE LIKE.

Application filed October 25, 1924. Serial No. 745,756.

*To all whom it may concern:*

Be it known that I, WOLFGANG OTTO, a citizen of the Republic of Germany, residing in Neumühlen, near Kiel, Germany, Heikendorfer Weg 9, have invented certain new and useful Improvements in or Relating to Gyroscopic Apparatus Having a Means for Indicating the Inclined Position of an Airship or the like, of which the following is a specification.

Heretofore it has been proposed to facilitate the use of telescopes on board a ship or an aerial craft by providing a gyroscopic device in connection therewith in order to stabilize or adjust the former with respect to the movements of the supporting body.

According to the present invention the advantages of automatically stabilizing or adjusting a telescope or, generally speaking, of fixing an aiming line, which are realizable in the stated way, are utilized for flying machines without the necessity of a particular gyroscopic device to be used for the purpose. According to the invention the aiming device is combined with a gyroscopic horizon of known construction, that is to say, a device adapted for measuring the lateral inclination of a flying machine.

It is known that a gyroscopic horizon enables the driver or observer to take a safe course over the clouds and at night since a device of the kind serves as substitute for the invisible natural horizon and, for this reason, is almost indispensable in traveling or flying on modern flying machines. Inherent to its nature, however, a device of the kind is adapted to indicate not only the horizon but also, if properly handled, approximately the true perpendicular line. Now if the device is combined, in accordance with the present invention with an aiming device which is adjusted by the gyroscope forming a part of the gyroscopic horizon, the usefulness of the latter is greatly enhanced and the advantages of an automatically adjustable aiming line are ensured without the necessity of any essential expenditure.

The advantages thus obtainable with a combined apparatus of the stated kind are most apparent e. g. in case of a flying machine for dropping shells. The driver or observer is obviously compelled to fly at night and over the clouds and, therefore, must be equipped with a gyroscopic horizon. Now if this apparatus is provided with an aiming device, the same will not be useless or dispensable when the driver has reached the place to be plied with shells and descends to a lower region from which to drop the shells; on the contrary the apparatus then serves as a desirable means for finding the correct direction in which to drop the shells.

With the above recited objects in view, the invention resides in the novel construction set forth in the following specification, particularly pointed out in the appended claims and depicted in the accompanying drawings, it being understood that the right is reserved to embodiments other than those actually illustrated herein to the full extent indicated by the general meaning of the terms in which the claims are expressed.

In the drawings—

Figure 1 is a vertical section view of a gyroscopic horizon combined with an aiming device according to the invention, Figure 2 is a side view with parts broken away of the same but displaced about a vertical axis for 90°. Figure 3 is a front view, with parts broken away, of a modified form of gyroscopic compass. Figure 4 is a side view thereof displaced about a vertical axis for 90° with regard to the view shown in Figure 3, and Figure 5 is a plan view of the gyroscopic compass shown in Figures 3 and 4.

Referring to the embodiment shown in Figures 1 and 2 the gyroscopic device is intended to indicate on a moving body, such as an airship or the like, the true perpendicular line and thence also the true horizontal line or the horizon. The aiming device combined therewith may in itself be of conventional construction.

The gyroscopic hood or casing *a* including the gyroscope mounted therein with its rotary axis in approximately vertical position, is adapted to oscillate, in suitable bearings *b* and *c*, about a horizontal axis. The two bearings *b* and *c* are supported by a Cardan joint ring *d* adapted to oscillate in turn, in bearings $e$ and $f$, about a second horizontal axis displaced for 90° with relation to the former. The bearings $e$ and $f$ are supported by a frame $g$ rigidly connected with the flying machine. The journal of the Cardan joint ring $d$ projects through and beyond the bearing $f$ to form an extension $l$ for a circular disk $m$ to be fixed thereon. The disk $m$ is or represents the usual means for readings for use in employing the gyroscope as a horizon.

According to the present invention the eye-piece $u$ of a telescope is mounted at $i$ on the frame $g$, see Figure 1, connected in the usual manner, not shown, with the flying machine or journalled in Cardan bearings, and further a bracket $v$ of the frame is provided to carry a triangular prism $w$ in front of the said eye-piece. A second bracket $x$ of the frame carries the object-glass or lens casing $y$ of the telescope including a second prism $z$ in optical opposition to the prism $w$ as will be readily understood by those skilled in the art. The path of a ray is indicated in Figure 1 by a dotted arrow line and it will be seen therefrom that, e. g. in case of horizontal position of the flying machine, in looking through the eye-piece $u$ the surface of the earth below will be viewed exactly as if one would look vertically through the apparatus.

Mounted on the hood or casing $a$ is an arm A supporting a spherical segment or plate B of glass provided with any appropriate division or graduation, the location of the segment or plate B being such that a person looking through the eye-piece $u$ will observe the graduated glass segment or plate together with the objects on the surface of the earth.

The arrangement of the parts is such that any object coinciding with the centre of the graduation lies exactly in the elongation of the axis of the gyroscope, setting aside, of course, the insignificant distance between the two prisms $w$ and $z$ and the displacement, if any, of the object lens $y$, just as accurately as the gyroscopic axis occupies the perpendicular line. The observer, therefore, will see, if the position of the flying machine is horizontal, the point which is just vertically below the flying machine below the zero mark or center of the graduation on plate B. If the eye-piece is provided with a cross-wire, the observer will be able to find out by comparison with the graduation or division of the glass segment or plate B, whether the optical axis of the telescope coincides with the gyroscopic axis or whether deviations are present. In the latter case the observer may give the necessary directions to the driver of the flying machine. Moreover, he may in case of coincidence of the centres of the two graduations, operate a photographic camera firmly connected with the flying machine and having its optical axis located parallel to that of the telescope, in order to ensure in this way an exactly horizontal position of the film or plate during exposure.

It will be seen that the invention is also useful for several other purposes e. g. for surveys, photographic views, mapping out a country in vertical direction and wherever certain points or places are to be aimed at from a flying machine. The combination of an aiming device of the stated kind with a gyroscopic horizon affords, as already intimated, an advantage in economical respects, since a combined apparatus for a double purpose can be produced at considerably lower cost than two separate gyroscopic apparatus each of which is for a single purpose only. Furthermore, the single combined apparatus is of by far lower weight than the two separate apparatus and the reductions of weight thus realized is very important in the equipage of a flying machine. Moreover the electric current required for tending the one combined apparatus is only about one half of that required for tending two separate apparatus so that a further reduction in weight is ensured by the fact that the source of current (generator or accumulator battery) on the flying machine will be of minor size and consequently of less weight.

In the embodiment illustrated in Figures 3 to 5 the single gyroscope of the gyroscopic horizon is replaced by a gyroscopic compass adapted to control or direct a plurality of follow-up systems. A directing system of this kind allows of being stabilized sufficiently in any plane, in order to be utilized as a gyroscopic horizon or as a means for adjusting aiming devices, telescopes or the like, in a manner similar to the one hereinbefore described. The thus resulting unit apparatus then accomplishes three important objects, namely, the measurement and indication of the inclined position of the flying machine, the measurement and indication of the flying direction and the adjustment of an aiming device.

Referring to Figures 3 to 5 $k$ denotes the base part of the apparatus firmly connected with the flying machine and $h$ is a bow or bridle supporting the ring $d$ of the Cardan joint. The ring $d$ is given, for constructional reasons, an oval or elliptical form, as will be clearly seen in Figure 5, instead of being of circular shape, as usually. The inner Cardan bearings $b$ and $c$ are of conventional shape and construction as also is the outer Cardan bearing $e$. The other outer bearing $f'$, however, is a ball-bearing of comparatively large diameter. The spherical fluid container $m'$ is suitably journalled in Cardan bearings. The telescope, therefore, is adapted to be moved about the point of intersection of the Cardan axes *b c* and *e f'* in order to be adjusted in relation to the apparent rotations of the gyroscopic system *a'* with regard to the flying machine. To this end on the upper pole of the spherical gyroscopic system a mark *n* is provided in cooperation with the prism *v* constructed and arranged in a manner that not only the rays or beams coming from the prism *z* are thrown into the eye-piece, but also a portion of the rays or beams coming from the mark *n* are transmitted therethrough. The mark *n* is, as usually, of a light colour on a dark ground and may be rendered visible say by means of a lamp located within the gyroscopic system *a'* or by means of external illumination.

The inner construction and arrangement of the gyroscopic system *a'* is not shown in the drawings and a description thereof appears to be unnecessary the more so since such construction and arrangement have nothing to do with the present invention and are known to persons skilled in the art. Generally speaking, the construction and arrangement necessarily must be such that a gyroscopic system is adapted to float in a liquid and said system is adapted to point to North and to sufficiently stabilize any rotations about all of the horizontal axes for the purpose in view.

The rotations of the flying machine about the vertical axis are indicated, in the usual manner, and can be read on the compass graduation or scale *o* forming the equator of the sphere. For the purpose a window *p* is provided in the liquor container *m'* and a vertical steering mark or line may be provided on the glass of the window. A second pane of glass 8 with a diagrammatically shown image of a flying machine as at *r* is located in front of the window *p*.

In the drawings it will be seen that the compass graduation or scale *o* coincides with the horizontal. On any inclination of the flying machine about its longitudinal axis the image *r* will adopt the same angular position in relation to the graduation or scale *o* as the flying machine occupies in relation to the real horizon. If the flying machine ascends the image *r* apparently goes down in relation to the graduation or scale *o* and vice versa. Further it must be noted that, in using the apparatus, the steering mark or line, contrasting with the usual reading, moves towards the left hand side in relation to the zero point which is stationary due to the gyroscopic arrangement, when the flying machine turns to the right hand side. These two apparent inversions, however, may easily be removed, if required or desired, in a known manner by means of optical reversing systems.

I have not attempted to explain all of the minute details of the construction of the apparatus, for it will be understood by those, to whom this specification is addressed, that the parts will necessarily be of the proper size and relationship, and will be properly mounted and supported according to the tenets of mechanical construction.

It also appears to be unnecessary to reiterate the operation of the apparatus, for the operation of the several parts has been described in detail. In reducing my invention to practice I find that the two forms described and shown herein are most efficient and preferred embodiments, but realizing that certain conditions will necessarily vary in concurrence with the adoption of my apparatus, I desire to emphasize the fact that various minor changes in the details of construction and in the proportion of parts may be resorted to when required, without sacrificing any of the advantages of my invention as defined in the appended claims.

What I claim is:—

1. An apparatus of the type described comprising a gyroscope, a casing therefor having a reference line thereon, a liquid container for said casing, a support, a Cardan mounting connecting said container to said support, an eye-piece and an object lens mounted on said container, a prism system interposed between the eye-piece and the object lens, the eye-piece and prism system being arranged so that both the reference line on the gyroscope casing and any objects vertically below the support are visible through the eye-piece.

2. An apparatus of the type described comprising a gyroscope, a casing therefor having a reference line thereon, a liquid container for said casing, a support, a Cardan mounting connecting said container to said support, an eye-piece and an object lens mounted on said container, a prism system interposed between the eye-piece and the object lens, the eye-piece and prism system being arranged so that both the reference line on the gyroscope casing and any objects vertically below the support are visible through the eye-piece, and the liquid container and support having reference lines thereon for indicating the lateral inclination of said support.

3. An apparatus of the type described comprising a gyroscope, a spherical casing therefor having a reference line circumferentially disposed thereon and a graduated scale disposed at right angles to said line, a liquid container for said casing, a transparent plate in the wall of said container for exposing said scale to view, a support, a transparent plate carried by said support and having a reference line arranged opposite to the plate in said container, a Cardan mounting connecting said container to said support, an eye-piece and an object lens mounted on said container, a prism system interposed between the eye-piece and the object lens, the eye-piece and prism system being arranged so that both the reference line on the gyroscope casing and any objects vertically below the support are visible through the eye-piece.

In witness whereof I have hereunto set my hand in presence of two witnesses.

WOLFGANG OTTO.

Witnesses:
R. KASPARCH,
EDITH DISSE.